United States Patent [19]
Saegusa

[11] Patent Number: 5,995,068
[45] Date of Patent: Nov. 30, 1999

[54] DISPLAY DEVICE HAVING AN EXPANDED DISPLAY RANGE IN A LIMITED ANALOG DISPLAY AREA

[75] Inventor: Takashi Saegusa, Kawasaki, Japan

[73] Assignee: Nikon Corporation, Tokyo, Japan

[21] Appl. No.: 08/858,346

[22] Filed: May 19, 1997

[30] Foreign Application Priority Data

May 20, 1996 [JP] Japan ................................. 8-124541

[51] Int. Cl.⁶ ...................................................... G09G 3/00
[52] U.S. Cl. .................................................. 345/30; 345/31
[58] Field of Search ................................. 345/30, 31, 33, 345/35, 55; 340/810.69, 815.78; 348/333, 334; 377/18

[56] References Cited

U.S. PATENT DOCUMENTS

| | | | |
|---|---|---|---|
| 4,297,018 | 10/1981 | Murakami et al. ................... | 396/249 |
| 4,544,254 | 10/1985 | Egawa et al. ........................ | 396/106 |
| 4,754,296 | 6/1988 | Neely ................................... | 396/147 |
| 5,113,217 | 5/1992 | Izumi et al. ......................... | 396/292 |
| 5,386,300 | 1/1995 | Kitawaki ............................. | 358/426 |
| 5,682,558 | 10/1997 | Kirigaya et al. ..................... | 396/63 |
| 5,745,101 | 4/1998 | Yamamotto et al. ................ | 345/507 |

*Primary Examiner*—Dennis-Doon Chow
*Assistant Examiner*—Fritz Alphonse

[57] ABSTRACT

A display device to indicate positive and negative display values by increasing or decreasing a number of lit display elements to provide a display device that allows an expansion of the display range in the limited analog display area of a display section. The display device includes a first display element group that is lit to indicate display values; a second display element group located near the first display element group that is lit to indicate an origin corresponding to the display value; and a control device to control, lighting of a display value by the first display element according to a position of the origin.

19 Claims, 12 Drawing Sheets

| Address of Symbol Display Segment Display Table | Symbol Display Segment | | | | | | | | |
|---|---|---|---|---|---|---|---|---|---|
| | 41 | 42 | 43 | 44 | 45 | 46 | 47 | 48 | 49 |
| 0 |  | 1 | 1 | 1 | 1 | 1 | 1 | 1 | 1 |
| 1 |  | 1 | 1 | 1 | 1 | 1 | 1 | 1 |  |
| 2 |  | 1 | 1 | 1 | 1 | 1 | 1 |  |  |
| 3 |  | 1 | 1 | 1 | 1 | 1 | 1 | 1 |  |
| 4 |  | 1 | 1 | 1 | 1 | 1 | 1 |  |  |
| 5 |  | 1 | 1 | 1 | 1 | 1 |  |  |  |
| 6 |  | 1 | 1 | 1 | 1 |  |  |  |  |
| 7 |  |  | 1 | 1 | 1 |  |  |  |  |
| 8 |  |  |  | 1 | 1 |  |  |  |  |
| 9 |  |  |  |  | 1 |  |  |  |  |
| 10 |  |  |  |  | 1 | 1 |  |  |  |
| 11 |  |  |  |  | 1 | 1 | 1 |  |  |
| 12 |  |  |  |  | 1 | 1 | 1 | 1 |  |
| 13 |  |  |  | 1 | 1 | 1 | 1 | 1 |  |
| 14 |  |  | 1 | 1 | 1 | 1 | 1 | 1 |  |
| 15 |  | 1 | 1 | 1 | 1 | 1 | 1 | 1 |  |
| 16 |  |  | 1 | 1 | 1 | 1 | 1 | 1 |  |
| 17 |  | 1 | 1 | 1 | 1 | 1 | 1 | 1 |  |
| 18 | 1 | 1 | 1 | 1 | 1 | 1 | 1 | 1 |  |
| 19 |  | 1 | 1 | 1 | 1 | 1 | 1 | 1 | 1 |
| 20 | 1 | 1 | 1 | 1 | 1 | 1 | 1 | 1 |  |

FIG. 3

| Address of Display Table | '2' | Resolution Display Segment | | | | | | | '2' |
|---|---|---|---|---|---|---|---|---|---|
| | 51 | 52 | 53 | 54 | 55 | 56 | 57 | 58 | 59 |
| 0 | | 1 | 1 | 1 | 1 | 1 | 1 | 1 | |
| 1 | | 1 | 1 | 1 | 1 | 1 | 1 | 1 | |
| 2 | | 1 | 1 | 1 | 1 | 1 | 1 | 1 | |
| 3 | | 1 | 1 | 1 | 1 | 1 | 1 | 1 | 1 |
| 4 | | 1 | 1 | 1 | 1 | 1 | 1 | 1 | |
| 5 | | 1 | 1 | 1 | 1 | 1 | 1 | 1 | |
| 6 | | 1 | 1 | 1 | 1 | 1 | 1 | 1 | |
| 7 | | 1 | 1 | 1 | 1 | 1 | 1 | 1 | |
| 8 | | 1 | 1 | 1 | 1 | 1 | 1 | 1 | |
| 9 | | 1 | 1 | 1 | 1 | 1 | 1 | 1 | |
| 10 | | 1 | 1 | 1 | 1 | 1 | 1 | 1 | |
| 11 | | 1 | 1 | 1 | 1 | 1 | 1 | 1 | |
| 12 | | 1 | 1 | 1 | 1 | 1 | 1 | 1 | |
| 13 | | 1 | 1 | 1 | 1 | 1 | 1 | 1 | |
| 14 | | 1 | 1 | 1 | 1 | 1 | 1 | 1 | |
| 15 | 1 | 1 | 1 | 1 | 1 | 1 | 1 | 1 | |
| 16 | | 1 | 1 | 1 | 1 | 1 | 1 | 1 | |
| 17 | | 1 | 1 | 1 | 1 | 1 | 1 | 1 | |
| 18 | | 1 | 1 | 1 | 1 | 1 | 1 | 1 | |
| 19 | | 1 | 1 | 1 | 1 | 1 | 1 | 1 | 1 |
| 20 | 1 | 1 | 1 | 1 | 1 | 1 | 1 | 1 | |

FIG. 4

| Address of Display Table | '+' | Section Display Segment | | | | | | | | '−' |
|---|---|---|---|---|---|---|---|---|---|---|
| | | 61 | 62 | 63 | 64 | 65 | 66 | 67 | 68 | 69 |
| 0 | | | 1 | | 1 | | 1 | | 1 | 1 |
| 1 | | | 1 | | 1 | | 1 | | 1 | 1 |
| 2 | | | 1 | | 1 | | 1 | | 1 | 1 |
| 3 | | | 1 | | | | 1 | | 1 | 1 |
| 4 | | | | 1 | | | 1 | | | 1 |
| 5 | | | 1 | | 1 | | | 1 | | 1 |
| 6 | | 1 | 1 | | | 1 | | | 1 | 1 |
| 7 | | 1 | 1 | | | 1 | | | 1 | 1 |
| 8 | | 1 | 1 | | | 1 | | | 1 | 1 |
| 9 | | 1 | 1 | | | 1 | | | 1 | 1 |
| 10 | | 1 | 1 | | | 1 | | | 1 | 1 |
| 11 | | 1 | 1 | | | 1 | | | 1 | 1 |
| 12 | | 1 | 1 | | | 1 | | | 1 | 1 |
| 13 | | 1 | | 1 | | | 1 | | | |
| 14 | | 1 | | | 1 | | | 1 | | |
| 15 | | 1 | 1 | | | 1 | | | 1 | |
| 16 | | 1 | 1 | | 1 | | 1 | 1 | 1 | |
| 17 | | 1 | 1 | | 1 | | 1 | 1 | 1 | |
| 18 | | 1 | 1 | | 1 | | 1 | 1 | 1 | |
| 19 | | | 1 | | | 1 | | | 1 | 1 |
| 20 | | 1 | 1 | | | 1 | | | 1 | |

FIG. 5

| Address of Display Table | '3' 71 | 72 | 73 | 74 | 75 | 76 | 77 | 78 | '3' 79 |
|---|---|---|---|---|---|---|---|---|---|
| 0 |  | 1 |  |  |  |  |  |  | 1 |
| 1 |  | 1 |  |  |  |  |  |  | 1 |
| 2 |  | 1 |  |  |  |  |  |  | 1 |
| 3 |  | 1 |  |  |  |  |  |  |  |
| 4 |  |  | 1 |  |  |  |  |  |  |
| 5 |  |  |  | 1 |  |  |  |  |  |
| 6 |  |  |  |  | 1 |  |  |  |  |
| 7 |  |  |  |  | 1 |  |  |  |  |
| 8 |  |  |  |  | 1 |  |  |  |  |
| 9 |  |  |  |  | 1 |  |  |  |  |
| 10 |  |  |  |  | 1 |  |  |  |  |
| 11 |  |  |  |  | 1 |  |  |  |  |
| 12 |  |  |  |  | 1 |  |  |  |  |
| 13 |  |  |  |  |  | 1 |  |  |  |
| 14 |  |  |  |  |  |  | 1 |  |  |
| 15 |  |  |  |  |  |  |  | 1 |  |
| 16 | 1 |  |  |  |  |  |  | 1 |  |
| 17 | 1 |  |  |  |  |  |  | 1 |  |
| 18 | 1 |  |  |  |  |  |  | 1 |  |
| 19 |  | 1 |  |  |  |  |  |  |  |
| 20 |  |  |  |  |  |  |  | 1 |  |

FIG. 6

| Range of $\triangle$ EV | Address of Display Table | |
|---|---|---|
| | Standard Display | Optional Display |
| $\triangle EV \leq -3\ 1/4$ | 0 | 19 |
| $-3\ 1/4 < \triangle EV \leq -2\ 3/4$ | 1 | 19 |
| $-2\ 3/4 < \triangle EV \leq -2\ 1/4$ | 2 | 19 |
| $-2\ 1/4 < \triangle EV \leq -1\ 5/6$ | 3 | 3 |
| $-1\ 5/6 < \triangle EV \leq -1\ 3/6$ | 4 | 4 |
| $-1\ 3/6 < \triangle EV \leq -1\ 1/6$ | 5 | 5 |
| $-1\ 1/6 < \triangle EV \leq -5/6$ | 6 | 6 |
| $-5/6 < \triangle EV \leq -3/6$ | 7 | 7 |
| $-3/6 < \triangle EV \leq -1/6$ | 8 | 8 |
| $-1/6 < \triangle EV < +1/6$ | 9 | 9 |
| $+1/6 \leq \triangle EV < +3/6$ | 10 | 10 |
| $+3/6 \leq \triangle EV < +5/6$ | 11 | 11 |
| $+5/6 \leq \triangle EV < +1\ 1/6$ | 12 | 12 |
| $+1\ 1/6 \leq \triangle EV < +1\ 3/6$ | 13 | 13 |
| $+1\ 3/6 \leq \triangle EV < +1\ 5/6$ | 14 | 14 |
| $+1\ 5/6 \leq \triangle EV < +2\ 1/4$ | 15 | 15 |
| $+2\ 1/4 \leq \triangle EV < +2\ 3/4$ | 16 | 20 |
| $+2\ 3/4 \leq \triangle EV < +3\ 1/4$ | 17 | 20 |
| $+3\ 1/4 \leq \triangle EV$ | 18 | 20 |

FIG. 7

DISPLAY DEVICE HAVING AN EXPANDED DISPLAY RANGE IN A LIMITED ANALOG DISPLAY AREA

CROSS REFERENCE TO RELATED APPLICATIONS

This application is based upon and claims priority from Japanese Patent Application No. 8-124541 filed May 20, 1996, the contents of which are incorporated herein by reference.

BACKGROUND OF THE INVENTION

1. Field of the Invention

The present invention relates to a display device to indicate positive and negative display values by increasing or decreasing a number of display elements which are lit, and, more particularly, the present invention relates to a display device used in a camera or exposure meter having an expanded display range in a limited analog display area.

2. Description of the Related Art

Cameras which have a display section to indicate various states of the camera are known. To meet the diverse needs of the user, the display section may be provided inside of or outside of a viewfinder in a limited display area of the display section. The display section of the camera may include different types of digital display of numerical values, such as the shutter speed and aperture settings, as well as analog display of the exposure value (hereinafter referred to as "EV") during the manual exposure control mode.

The known display sections for displaying an EV include multiple symbol display elements (hereinafter referred to as "display segments") arranged in a single row in the display area of the display section. A specified number of the symbol display segments are interconnected and extend in a positive or a negative direction from the location of an origin, which is the central area of the row of the multiple symbol display segments. The display segments are lit according to a discrepancy between a photometric value and a set value ($\pm\Delta EV$), as well as a positive or negative value.

FIG. 16 shows an example of the configuration of a conventional EV display section. As shown in FIG. 16, the conventional EV display section consists of a fixed display section 35 and variable display sections 31–34 and 36–39. Each of the fixed display section 35 and the variable display sections 31–34 and 36–39 consist of liquid crystal display (LCD) display segments.

The fixed display section 35 consists of a positive ("+") display section 35a, an origin "0" display section 35f, and a negative ("−") display section 35j. Display segment 35e in the origin display section 35f is used to indicate that exposure is correct. Display segment 35b in the "+" display section 35a is at a position indicating an exposure value of +1 [EV] over correct exposure. Display segment 35i in the "−" display section 35j is at a position indicating an exposure value of −1 [EV] under correct exposure. Display segments 35c, 35d, 35g, and 35h are at positions indicating increments in exposure value of ⅓ [EV].

In the fixed display section 35, all of the display segments 35a–35j are driven in a consolidated manner to be lit or extinguished by a common signal. Therefore, all of the display segments 35a–35j are always lit while displaying the exposure value. However, each symbol display segment 31–34 and 36–39 in the variable display section is arranged in a single, horizontal row, and the display segments 31–34 and 36–39 are individually and independently driven to be lit or extinguished. A measured difference between the photometric value and the set value ($\pm\Delta EV$) is displayed by increasing or decreasing the number of display segments 31–34 and 36–39 that are lit.

In the conventional display section shown in FIG. 16, the fixed display section 35 is lit during the manual exposure control mode. While the fixed display section 35 is lit during manual exposure control mode, the step between the $\pm$[EV] range and the state that exceeds the range is indicated by the variable display section 31–34 and 36–39, as will be described in detail below, thereby visually displaying $\Delta EV$.

More specifically, when $\Delta EV$ is ⅓[EV] over correct exposure, the symbol display segment 34 is lit in addition to the fixed lighting of display segment 35e, which indicates the correct exposure. When $\Delta EV$ is ⅔[EV] over correct exposure, symbol display segments 33 and 34 are lit in addition to the fixed lighting of display segment 35e. When $\Delta EV$ is +1 [EV], symbol display segments 32–34 are lit in addition to display segment 35e. When $\Delta EV$ exceeds correct exposure by +1[EV], all of display segments 31–34 located on the over exposure side with reference to the position of the origin "0" are lit in addition to the fixed lighting of display segment 35e.

Similarly, when $\Delta EV$ is ⅓[EV] under correct exposure, symbol segment 36 is lit in addition to the fixed lighting of display segment 35e which indicates the correct exposure. When $\Delta EV$ is ⅔[EV] under correct exposure, symbol display segments 36 and 37 are lit in addition to the fixed lighting of display segment 35e. When $\Delta EV$ is 1[EV] under correct exposure, symbol display segments 36–38 are lit in addition to the fixed lighting of display segment 35e. When $\Delta EV$ exceeds 1[EV] under correct exposure, all of symbol display segments 36–39 located on the under exposure side with reference to the position of the origin "0" are lit in addition to the fixed lighting of display segment 35e.

As described above, a change of $\Delta EV$ from the origin "0" to the over (under) exposure side of up to +1 (−1) [EV] is indicated in analog form by increasing or decreasing the displayed exposure value incrementally with ⅓[EV] step changes. When the change of $\Delta EV$ on the over (under) exposure side exceeds +1 (−1) [EV], all of symbol display segments 31–34 (36–39) located on the over (under) exposure side with reference to the position of the origin "0" are lit, thereby enabling a user to identify whether $\Delta EV$ is within $\pm 1$[EV].

The type of display method illustrated in FIG. 16 may be applied not only to display a discrepancy during manual exposure, but also to display an instance wherein the deviation from a numerical value used as a reference value can be indicated through steps in an analog form. For example, the display of FIG. 16 can be used to indicate an exposure correction amount, a light adjustment correction amount, or the difference in exposure between central-oriented photometry and multiple photometry.

When the deviation from a numerical value used as the reference value is indicated through steps in analog form, unlike the indication of a numerical value, a designated area is required for positioning the multiple symbol display segments. Furthermore, the indication range is stipulated based on the number of segments that can be positioned in the designated area.

However, as noted above, it is difficult to maintain sufficient area for an analog display in a display section having various display indicators. Thus, the analog display area tends to be smaller and cannot meet the needs of users who require an expanded display range. More specifically, a conventional camera is only capable of indicating the discrepancy amount up to ±1 [EV] for users who actually want an indication of up to ±2 [EV]. Furthermore, some users want an indication of the discrepancy amount ±ΔEV of up to ±3 [EV].

In order to achieve the requirements of those users wanting an expanded display range, an analog display area in the display section may be expanded. However, expanding the analog display area will eliminate display area used to display information preferred by other users, for example, those who require display of numerical values.

SUMMARY OF THE INVENTION

It is an object of the present invention to eliminate the problems of the conventional displays described above, and to provide a display device having an expanded display range in a limited analog display area of a display section.

Additional objects and advantages of the invention will be set forth in part in the description which follows, and, in part, will be obvious from the description, or may be learned by practice of the invention.

Objects and advantages of the present invention are achieved in accordance with a first embodiment of the invention with a display device including a first display element group having display elements which are selectively activated to display a display value; a second display element group positioned near the first display element group and having display elements which are selectively activated to indicate an origin corresponding to the display value; and a control unit to control display of the display value by activating selected display elements from the first display element group with respect to an origin position indicated by activating a selected display element from the second display element group.

The display device in accordance with the first embodiment further includes a third display element group positioned near the first and second display element groups to display a scale corresponding to the display value.

The display device in accordance with the first embodiment further includes a fourth display element group positioned near the first and second display element groups to display a range corresponding to the display value.

The display device in accordance with the first embodiment further includes a fifth display element group positioned near the first and second display element groups to display a resolution of the display corresponding to the display value.

The display device in accordance with the first embodiment further includes a positive display element positioned near the first and second display element groups to display a positive value corresponding to the display value; and a negative display element positioned near the first and second display element groups to display a negative value corresponding to the display value.

Objects and advantages of the present invention are achieved in accordance with a second embodiment of the invention with a display device including a first display element group to indicate a display value; a second display element group positioned near the first display element group to indicate a scale corresponding to the display value; and a control unit to control activation of the first display element group according to the display value, and to adjust the scale by selectively activating the second display element group, wherein a range of the display value displayed by the first display element group is changed.

Objects and advantages of the present invention are achieved in accordance with a third embodiment of the present invention with a display device, including a first display element group to indicate a display value; a second display element group positioned near the first display element group to indicate a scale corresponding to the display value; a selection device to select respective ranges of the first and second display element groups; and and a control unit to control activation of the first display element group according to the display value, to adjust the scale indicated by the second display element group according to a range selected by the selection device and to adjust the indication of the first display element group based on the adjustment of the scale.

Objects and advantages of the present invention are achieved in accordance with another embodiment of the present invention with a display device to display a display value, comprising a first display element group including a plurality of display segments which are selectively activated to indicate the display value according to a number of the display segments of the first display element group which are activated; a second display element group including a plurality of display segments which are selectively activated to indicate an origin position according to a display segment of the second display element group which is activated; and a control unit to activate an origin display segment and a number of display segments of the first display element group according to the display value to display the display value.

The display device further comprises a third display element group including a plurality of display segments positioned near the first display element group and the second display element group to indicate a display scale according to the display value.

The display device further comprises a fourth display element group including a plurality of display segments positioned near the first and second display element groups to display a display range according to the display value.

The display device further comprises a fifth display element group including a plurality of display segments positioned near the first and second display element group to display a resolution of the display corresponding to the display value.

The display device further comprises a positive display element positioned near the first and second display element groups to display a positive value corresponding to the display value; and a negative display element positioned near the first and second display element groups to display a negative value corresponding to the display value.

The control unit of the display device adjusts the display scale by selectively activating the third display element group, wherein a range of the display value displayed by the first display element group is changed.

The display device further comprises a sensor to measure a display value, wherein the control unit comprises a display table containing a plurality of ranges of display values, and the display segments which are activated are selected according to a range into which the measured value falls.

The display table includes drive data corresponding to the range into which the measured value falls for driving selected display segments.

The display device activates every other display segment of the third display element group to indicate increments of ½.

The display device activates every third display segment of the third display element group is to indicate increments of ⅓.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIG. 3 is a diagram showing the content of a display table containing data for a symbol display segment in accordance with the first embodiment of the present invention.

FIG. 4 is a diagram showing the content of a display table containing data for a resolution display segment in accordance with the first embodiment of the present invention.

FIG. 5 is a diagram showing the content of a display table containing data for a section display segment in accordance with the first embodiment of the present invention.

FIG. 6 is a diagram showing the content of a display table containing data for an origin display segment in accordance with the first embodiment of the present invention.

FIG. 7 is a diagram showing the content of a correlation table providing a correction between the range of $\Delta EV$ and the display table in accordance with the first embodiment of the present invention.

DETAILED DESCRIPTION OF THE PREFERRED EMBODIMENTS

Figure 1:
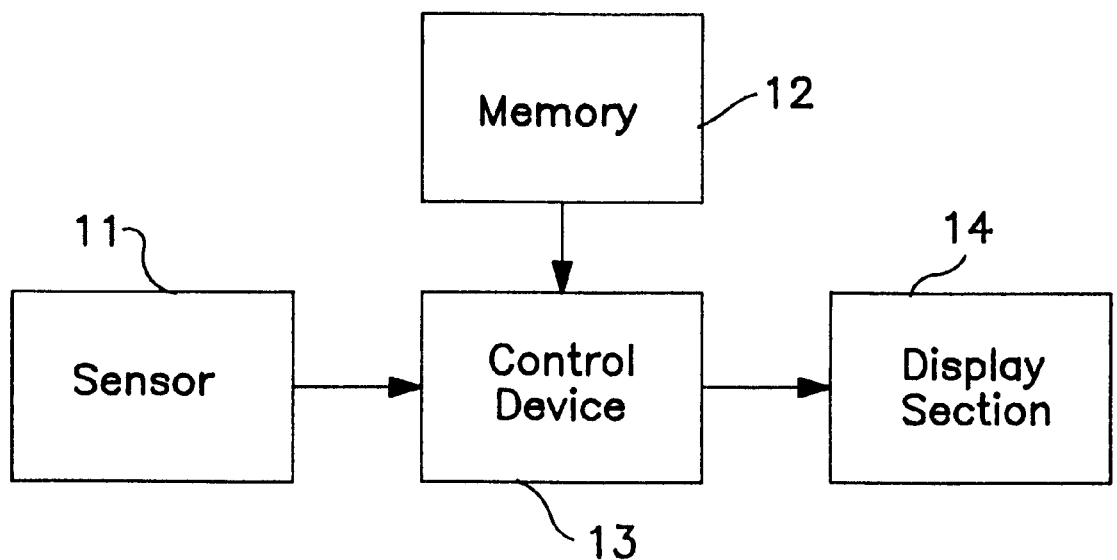
FIG. 1 is a block diagram of a display device in accordance with a first embodiment of the present invention.

Reference will now be made in detail to the preferred embodiments of the present invention, examples of which are illustrated in the accompanying drawings wherein like reference numerals refer to the same or similar elements throughout.

FIG. 1 is a block diagram of a display device in accordance with a first embodiment of the present invention. The display device shown in FIG. 1 is applied to a display for displaying a $\pm \Delta EV$ (exposure value), which may be a display value in a camera or exposure meter.

The display device comprises a sensor 11, a memory 12, a control device 13, and a display section 14. The sensor 11 detects an exposure amount and provides the detected exposure amount to the control section 13. The memory 12 stores various data such as identification data which identifies whether the display is a "standard display" or an "optional display", a display table and a relation table, which will be described in detail hereinafter.

Figure 12:
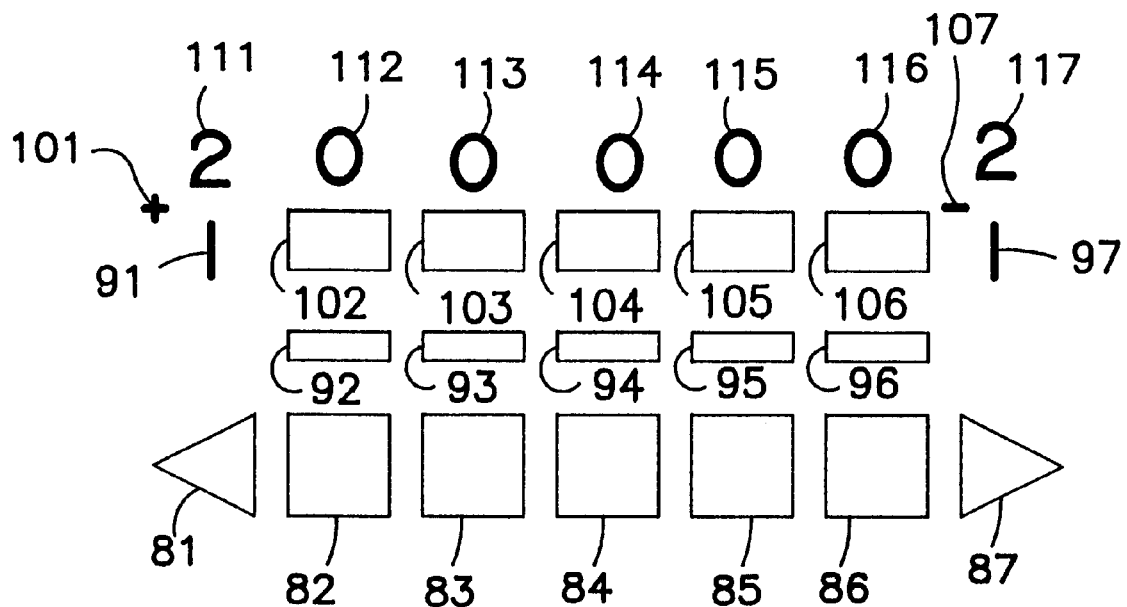
FIG. 12 is a diagram showing a configuration of a display section of a display device in accordance with a second embodiment of the present invention.

A photometry value and a set value are entered at sensor 11, and the control device 13 calculates $\pm \Delta EV$ from the photometry value and set value entered at the sensor 11. The display section 14 displays the calculated $\pm \Delta EV$ while referencing the memory 12. The display section 14 is configured in a manner, for example, as shown in FIG. 2 or FIG. 12.

Figure 2:
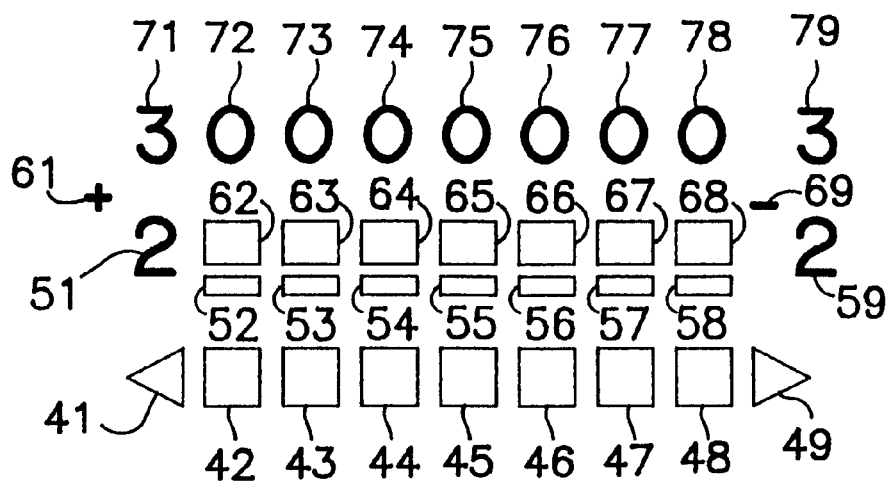
FIG. 2 is a diagram showing a configuration of a display section of the display device in accordance with the first embodiment of the present invention.

FIG. 2 is a schematic diagram showing the configuration of the display section 14 in accordance with the first embodiment of the present invention. As shown in FIG. 2, the display section 14 includes display segments 41–49, 51–59, 61–69, and 71–79.

Display segments 41–49 are arranged in a single horizontal row, and are symbol display segments which indicate $\pm \Delta EV$ in steps. The row of symbol display segments 41–49 includes two triangular symbol display segments 41 and 49 at opposite ends of the row of display segments, and square symbol display segments 42–48 between the two triangular symbol display segments 41, 49. The triangular symbol display segments 41 and 49 indicate that a display value has exceeded the display range, while the square symbol display segments 42–48 indicate a display value, in steps, within the display range.

Further, the display segments 52–58 are resolution display segments; the display segments 62–68 are section display segments; and the display segments 72–78 are origin display segments. Each group of respective display segments 52–58, 62–68 and 72–78 is arranged in a single, horizontal row having display elements which are aligned on a one-to-one basis with the square symbol display segments 42–48.

Moreover, a "2" display segment 51, a "+" display segment 61, and a "3" display segment 71 are arranged in a vertical direction on the triangular symbol display segment 41 side of the display, at the left side of FIG. 2. Similarly, a "2" display segment 59, a "−" display segment 69, and a "3" display segment 79 are arranged in a vertical direction on the triangular symbol display segment 49 side of the display, at the right side of FIG. 2. It is noted that a "1" display segment is not shown in FIG. 2. However, in accordance with the embodiment shown in FIG. 2, it is assumed that the display range is "1" if a display of neither "2" nor "3" is present.

The display segments shown in FIG. 2 may be similar to conventional liquid crystal display (LCD) display segments. However, the display segments in accordance with embodiments of the present invention differ from the conventional type of display segments in that these display segments can be individually and independently lit or extinguished.

The resolution display segments 52–58 may be configured to be lit at all times. However, in accordance with the first embodiment of the present invention, it is possible to individually and independently light or extinguish the resolution display segments 52–58 in a manner similar to the other display segments. Further, when arranging the display segments in a matrix, it is more convenient to light or extinguish them individually and independently.

The operation of the display device in accordance with the first and second embodiments of the present invention will now be explained below with reference to FIG. 3 and subsequent figures.

FIGS. 3 through 6 show the content of the display tables stored in the memory 12. More particularly, FIG. 3 illustrates the content of a display table which sets the lit/extinguished data for symbol display segments 41–49; FIG. 4 illustrates a display table which sets the lit/extinguished data for resolution display segments 51–59; FIG. 5 illustrates a display table which sets the lit/extinguished data for section display segments 61–69; and FIG. 6 illustrates the lit/extinguished data for origin display segments 71–79.

FIG. 7 is a diagram showing a correlation table containing data correlating the range of ΔEV and the display tables shown in FIGS. 3–6. The correlation table is stored in memory 12 in the same manner as the display tables shown in FIGS. 3 through 6. As shown in FIG. 7, in accordance with the first embodiment of the present invention, there are nineteen (19) different ranges for ΔEV, ranging from ΔEV≦−3¼ to ΔEV≧+3¼. Each range of ΔEV is assigned an address corresponding to an address of the display table in the case of a "standard display" and an "optional display." It is noted that the numerical values which indicate the ranges for ΔEV are expressed in terms of whole numbers and fractions. For example, "3¼" represents the fraction "3 and ¼."

Figure 8:
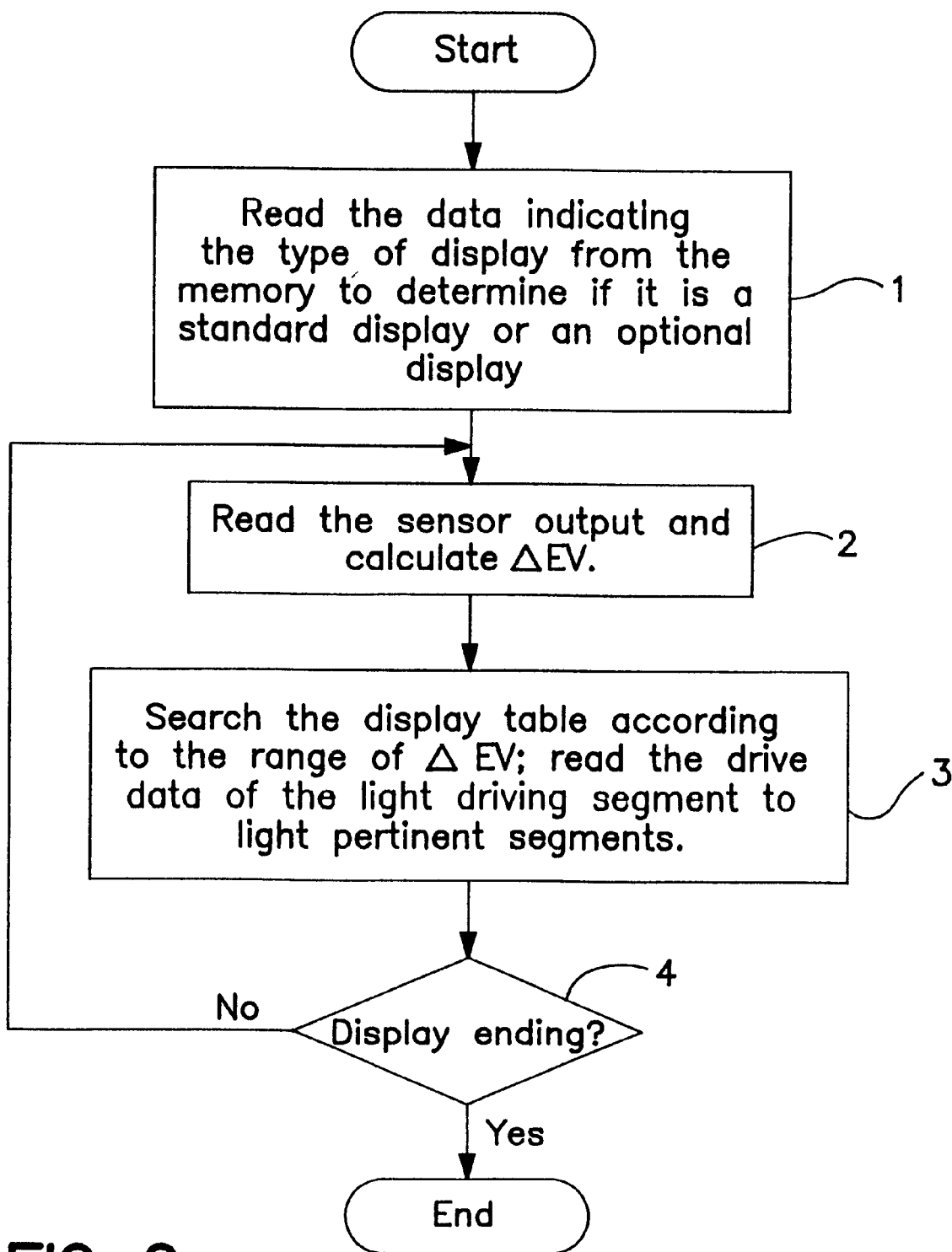
FIG. 8 is a flowchart showing an operational process for displaying exposure values in accordance with the first embodiment of the present invention.
Figure 9:
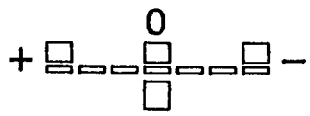
FIG. 9 is a diagram showing an example of a display during correct exposure in accordance with the first embodiment of the present invention.

FIG. 8 is a flowchart showing an operational process for a display control operation executed by the control device 13. Control device 13 executes the display control operation in accordance with the operational process shown in FIG. 8 when a shutter release button is pressed half-way during, for example, the camera's manual exposure. As a result of half-depression of the release button, ΔEV is displayed in steps in the display section 14. Representative examples of the display of ΔEV in display section 14 are shown in FIGS. 9–11.

As shown in FIG. 8, the operational process for the display operation begins when a command, such as pushing the shutter release button half-way, is entered. The control device 13 then reads data indicating the display type from the memory 12 to determine whether the display is a standard display or an optional display (Step #1).

The advantages in providing two display methods and the difference between the standard display and optional display in accordance with embodiments of the present invention will be described below.

Users who emphasize a display range with a larger deviation in ΔEV prefer a range with a ½[EV] step resolution, rather than a display of a smaller range with a ⅓[EV] step resolution. On the other hand, other users who emphasize a display range with a small deviation in ΔEV may want to recognize minute differences with a ⅓[EV] step resolution, even though the display range is smaller.

Therefore, in accordance with embodiments of the present invention, the standard display is designed to meet the needs of users who emphasize the range of the display more than the resolution of the display, and the standard display provides a range of ±3[EV] with a resolution of ½[EV]. Further, the optional display is designed to accommodate the needs of users who emphasize the resolution of the display more than the display range, and the optional display provides a display range of ±2[EV] with a resolution of ⅓[EV].

For example, if the data indicating the display type is "1", the control device 13 determines that the display is a standard display. However, if the data indicating the display type is "0", the control device 13 determines that the display is an optional display. Through reading the type of display, it is determined whether the address of the display table read from FIG. 7 corresponds to a standard display table or an optional display table. More particularly, although two types of displays, standard display and optional display, are possible in accordance with the first embodiment of the present invention, the display which is used is automatically set in consideration of the actual application.

Next, the control device 13 reads the output of sensor 11 and determines a discrepancy amount ΔEV during manual exposure through calculation using the following equation (1) (Step #2). In equation (1), AV represents an APEX value of the aperture value, TV represents an APEX value of the shutter speed, SV is an APEX value of the photographic speed, and BV is an APEX value of the brightness value.

$$\Delta EV = (BV+SV) - (TV+AV) \tag{1}$$

Based on the value for ΔEV obtained in Step #2, it is determined which "ΔEV range" from those ranges found in the left column of FIG. 7 corresponds to the ΔEV obtained. Control device 13 then reads the applicable address corresponding to the "standard display table" or the "optional display table" located in the right column in FIG. 7, searches the display tables shown in FIGS. 3–6 according to the address read from the correlation table, reads from the display tables shown in FIGS. 3–6, the drive data indicating to light certain display segments, and lights the applicable display segments (Step #3).

For example, if the value of ΔEV obtained is "−4," ΔEV≦−3¼. Therefore, the applicable range in the table of FIG. 7 is found in the first row of the table. The addresses "0" and "19" are read as applicable addresses for the standard display and the optional display, respectively. For the standard display, the display segment data at address "0" in the display tables in FIGS. 3–6 are read. In this example, the drive data of display segments 42–49, 52–58, 62, 64, 66, 68, 69, 72 and 79 are "1," and, accordingly, each of these display segments are driven and lit. As a result, a display as shown in FIG. 11F is provided in the display section 14.

On the other hand, for an optional display, the display segment data at address "19" in the display tables of FIGS. 3–6 are read. In this example, the drive data of display segments 42–49, 52–59, 62, 65, 68, 69 and 72 are "1," and, accordingly, each of these display segments are driven and lit. As a result, a display as shown in FIG. 11G is provided in display section 14.

In accordance with embodiments of the present invention, since the display is during manual exposure, the judgment at Step #4 of FIG. 8 is positive (YES) if the shutter release button is pressed down, thereby ending the display operation. However, if the half-pressed state of the shutter release button continues, the judgment at Step #4 is negative (NO), and instead of ending the display, Steps #2 and #3 are repeatedly executed until the shutter release button is pressed down, and the designated display is executed display section 14.

FIGS. 9–11 illustrate representative display examples in accordance with the first embodiment of the present invention.

FIG. 9 is an example of a display when ΔEV is −⅙<ΔEV<+⅙ and, as shown in FIG. 7, the data used to drive the display corresponds to standard display address "9" and optional display address "9". Specifically, FIG. 9 illustrates an example of a display during correct exposure.

As shown in FIG. 9, the "+" display segment 61 and the "−" display segment 69 are lit while other numerical value display segments are not lit, indicating that ΔEV is within the ±1[EV] range. Symbol display segment 45, located in the center of the arrangement of symbol display segments 41–49, and origin display segment 75, located in the corresponding center position in the arrangement of origin display segments 72–78, are lit to indicate the correct exposure. Moreover, all of the resolution display segments 52–58 are lit. Section display segment 65, corresponding to the origin position, as well as section display segments 62 and 68, located two segments from display segment 65 on either side, are lit. Section display segment 62 indicates the ±1[EV] range and section display segment 68 indicates −1[EV] range. Resolution display segments 52–58 are lit to indicate the resolution indices for each ⅓[EV] step.

Next, an example of a display during an over exposure condition will be described with reference to FIGS. 10A–10G, and an example of a display during an under exposure condition will be described with reference to FIGS. 11A–11G.

Figure 10A:
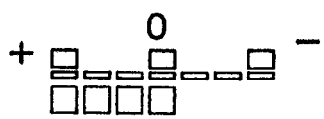
FIG. 10 is a diagram showing an example of a display of an over exposure condition in accordance with the first embodiment of the present invention.

FIG. 10A is an example of a display when ΔEV is +⅚≦ΔEV<+1⅙ and, as shown in FIG. 7, the data used to drive the display corresponds to standard display address "12". Specifically, FIG. 10A illustrates an example of a display when the exposure value is +1[EV] over correct exposure. As shown in FIG. 10A, square symbol display segments 42–45 corresponding to the position ranging from the correct exposure position, shown in FIG. 9, to +1[EV] over the correct exposure position are lit, indicating the +1[EV] over exposed condition.

Figure 11A:
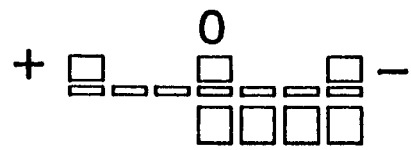
FIG. 11 is a diagram showing an example of a display of an under exposure condition in accordance with the first embodiment of the present invention.

On the other hand, FIG. 11A is an example of a display when ΔEV is −1⅙<ΔEV≦−⅚, and, as shown in FIG. 7, the data used to drive the display corresponds to standard display address "6" and optional display address 6. Specifically, FIG. 11A illustrates an example of a display when the exposure value is −1[EV] under correct exposure. As shown in FIG. 11A, square symbol display segments 45–48 corresponding to the position ranging from the correct exposure position, shown in FIG. 9, to −1[EV] under the correct exposure position are lit, indicating the −1[EV] under exposed condition.

As described above with reference to FIGS. 10A and 11A, since the display value is small within the ±1[EV] range, the position of the origin display segment 75 located in the center of origin display segments 72–78 is displayed as the position of the origin for display section 14.

However, as shown in FIGS. 10B–10G and FIGS. 11B–11G, since the display value is wide in the range where the display value exceeds ±1[EV], the origin is moved from the central location of the origin position to the over correct exposure side (+ side) or to the under correct exposure side (− side).

Figure 10B:

FIG. 10B is an example of a display when ΔEV is +1⅙≦ΔEV≦+1⅜ and, as shown in FIG. 7, the data used to drive the display corresponds to standard display address "13" and optional display address "13". Specifically, FIG. 10B illustrates an example of a display when the exposure value is +1⅓[EV] over correct exposure.

In comparison with FIG. 10A, the origin "0" display segment in FIG. 10B changes from display segment 75 to display segment 76. Correspondingly, the section display segments which indicate a 1[EV] increment move to the right, and display segments 63 and 66 are lit. Further, square symbol display segments 42–46 are lit to indicate the exposure value is +1⅓ [EV] over the correct exposure condition.

As shown in FIG. 10B, the "−" display segment 69 is extinguished as the display is changed to the over correct exposure side. Further, the resolution display segments 57 and 58 may both be extinguished since there is little necessity for lighting these segments.

Subsequently, if the exposure value reaches an additional ⅓ [EV] over correct exposure from the condition illustrated in FIG. 10B, the index indicating the position of the origin "0" moves further to the right.

Figure 10C:

FIG. 10C is an example of a display when ΔEV is +1⅚≦ΔEV<+2¼ and, as shown in FIG. 7, the data used to drive the display corresponds to standard display address "15" and optional display address "15". Specifically, FIG. 10C illustrates an example of a display when the exposure value is 2[EV] over correct exposure.

As shown in FIG. 10C, the origin display segment 78 is lit to indicate the position of the origin. Section display segments 62, 65, and 68 are lit as indexes for each 1[EV] increment, and "2" display segment 51 is also lit near "+" display segment 61, indicating 2[EV] over correct exposure. Further, square symbol display segments 42–48 are lit corresponding to 2[EV] over correct exposure.

Figure 10D:

FIG. 10D is an example of a display when ΔEV is +2¼≦ΔEV<+2¾ and, as shown in FIG. 7, the data used to drive the display corresponds to standard display address "16". Specifically, FIG. 10D illustrates an example of a display when the exposure value is ½ [EV] further over correct exposure from the display shown in FIG. 10C to reach +2½[EV] over correct exposure.

As shown in FIG. 10D, the origin display segment 78 remains lit to indicate the reference position. Section display segments 62, 64, 66 and 68 are lit as indexes for each 1[EV] increment, thereby indicating that resolution display segments 52–58 each represent a ½[EV] step. Further, square symbol display segments 43–48 are lit, excluding display segment 42 to indicate the exposure value is 2½[EV] over correct exposure.

Subsequently, near "+" display segment 61, the light on the display segment changes from "2" display segment 51 to "3" display segment 71, thereby indicating a change over to the 3 [EV] range. This change of display reduces error in identifying the reduced number of symbol display segments as symbol display segment 42 is extinguished even if the exposure value is ½ [EV] more over correct exposure in comparison with FIG. 10C.

Figure 10E:

FIG. 10E is an example of a display when ΔEV is +2¾≦ΔEV<+3¼ and, as shown in FIG. 7, the data used to drive the display corresponds to standard display address "17". Specifically, FIG. 10E illustrates an example of a display when the exposure value is further over correct exposure and reaches 3[EV] over correct exposure. In comparison with FIG. 10D, the only difference is that symbol display segment 42 has also been lit. In other words, the display shown in FIG. 10E indicates a ½[EV] increase with the addition of symbol display segment 42.

Figure 10F:

FIG. 10F is an example of a display when ΔEV is +3¼≦ΔEV, and, as shown in FIG. 7, the data used to drive the display corresponds to standard display address "18". Specifically, FIG. 10F illustrates an example of a display when the exposure value is further over correct exposure and reaches the 3[EV] over correct exposure condition, beyond the range that can be expressed through lighting of triangular symbol display segment 41.

Figure 10G:
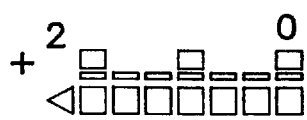

FIG. 10G is an example of a display when the limit for the display is reached when the exposure value is limited to a ⅓[EV] step, in a manner similar to the change from FIG. 10C to FIG. 10D. The display shown in FIG. 10G can be accomplished by reading the data of address 20 in the display table (FIGS. 3–6).

In the display example shown in FIG. 10G, the "3" display segment 71 is eliminated because it is unnecessary, and only "2" display segment 51 is provided next to the "+"display segment 61. Consequently, it is possible to display the exposure value without feeling uneasiness about the change in display resolution.

More specifically, FIG. 10G is an optional display corresponding to optional display address 20 shown in FIG. 7. Every display for the range above $+2¼ \leq \Delta EV < +2¾$ will be uniformly like the display shown in FIG. 10G that requires a change of the display range.

Figure 11B:
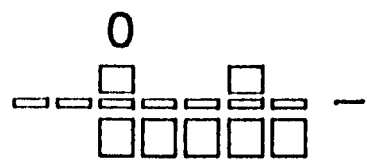

FIG. 11B is an example of a display when $\Delta EV$ is $-1⅚ < \Delta EV \leq 1⅙$ and, as shown in FIG. 7, the data used to drive the display corresponds to standard display address "5" and optional display address "5". Specifically, FIG. 11B illustrates an example of a display when the exposure value is $1⅓[EV]$ under correct exposure.

In comparison with FIG. 11A, the origin "0" display segment in FIG. 11B changes from display segment 75 to display segment 74. Correspondingly, the section display segments which indicate an index of 1[EV] increment move to the left, and section display segments 64 and 67 are lit. Further, square symbol display segments 44–48 are lit to indicate the exposure value is $+1⅓[EV]$ under the correct exposure condition.

As shown in FIG. 11B, the "+" display segment 61 is extinguished as the display is changed to the under correct exposure side, in contrast to FIG. 10B. Further, the resolution display segments 52 and 53 may both be extinguished since there is little necessity for lighting these segments.

Subsequently, if the exposure value reaches an additional $⅓[EV]$ under correct exposure from the condition illustrated in FIG. 11B, the index indicating the position of the origin "0" moves further to the left.

Figure 11C:
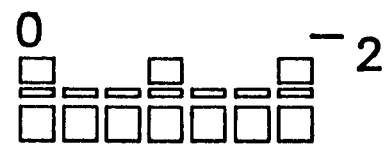

FIG. 11C is an example of a display when $\Delta EV$ is $-2¼ < \Delta EV \leq -1⅚$ and, as shown in FIG. 7, the data used to drive the display corresponds to standard display address "3" and optional display address "3". Specifically, FIG. 11C illustrates an example of a display when the exposure value is 2[EV] under correct exposure.

As shown in FIG. 11C, the origin display segment 72 is lit to indicate the position of the origin. Section display segments 62, 65 and 68 are lit as indexes for each 1[EV] increment, and "2" display segment 59 is also lit near "−" display segment 69, indicating 2[EV] under correct exposure. Further, square symbol display segments 42–48 are lit corresponding to 2[EV] under correct exposure.

Figure 11D:
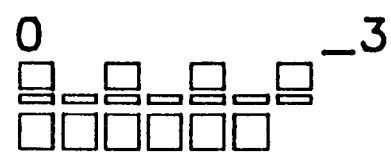

FIG. 11D is an example of a display when $\Delta EV$ is $-2¾ < \Delta EV \leq 2¼$ and, as shown in FIG. 7, the data used to drive the display corresponds to standard display address "2". Specifically, FIG. 11D illustrates an example of a display when the exposure value is $½[EV]$ further under correct exposure from the display shown in FIG. 11C to reach $+2½[EV]$ under correct exposure.

As shown in FIG. 11D, the origin display segment 72 remains lit to indicate the reference position. Section display segments 62, 64, 66 and 68 are lit as indexes for each 1[EV] increment, thereby indicating that resolution display segments 52–58 each represent a $½[EV]$ step. Further, square symbol display segments 42–47 are lit, excluding display segment 48, to indicate that the exposure value is $2½[EV]$ under correct exposure.

Subsequently, near "−" display segment 69, the light on the display segment changes from "2" display segment 59 to "3" display segment 79, thereby indicating a change over to the 3[EV] range. This change of display reduces error in identifying the reduced number of square symbol display segments as symbol display segment 48 is extinguished even if the exposure value is $½[EV]$ more under correct exposure in comparison with FIG. 11C.

Figure 11E:
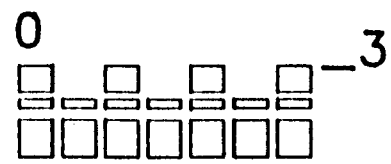
Figure 11F:
Figure 11G:
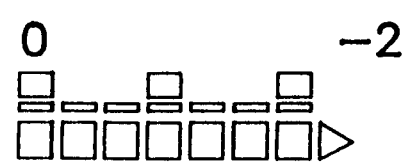

FIG. 11E is an example of a display when $\Delta EV$ is $-3¼ < \Delta EV \leq +2¾$, and, as shown in FIG. 7, the data used to drive the display corresponds to standard display address "1". Specifically, FIG. 11E illustrates an example of a display when the exposure value is further under correct exposure and reaches 3[EV] under correct exposure. In comparison with FIG. 11D, the only difference is that symbol display segment 48 has also been lit. In other words, the display shown in FIG. 11E indicates a $½[EV]$ increase with the addition symbol display segment 48.

FIG. 11F is an example of a display when $\Delta EV$ is $\Delta EV \leq 3¼$, and, as shown in FIG. 7, the data used to drive the display corresponds to standard display address "0". Specifically, FIG. 11F illustrates an example of a display when the exposure value is further under correct exposure and reaches the 3[EV] under correct exposure condition, beyond the range that can be expressed through lighting of triangular symbol display segment 49.

FIG. 11G is an example of a display when the limit is reached for the display when the exposure value is limited to a $⅓[EV]$ step, in a manner similar to that described with respect to the change from FIG. 11C to FIG. 11D. The display can be accomplished by reading the data of address "19" in the display table (FIGS. 3–6).

In the display example shown in FIG. 11G, the "3" display segment 79 is eliminated because it is unnecessary, and only "2" display segment 59 is provided next to the "−" display segment 69. Consequently, it is possible to display the exposure value without feeling uneasiness about the change in display resolution.

More specifically, FIG. 11G is an optional display corresponding to the optional display address "19" as shown in FIG. 7. Every display for the under correct exposure range below $-2¾ < \Delta EV \leq -2¼$ that requires a change of the display range will be uniformly like the display shown in FIG. 11G. The display shown in FIG. 11G corresponds to the display of FIG. 10G, except that the display shown in FIG. 11G is on the opposite side of the display scale.

Figure 16:
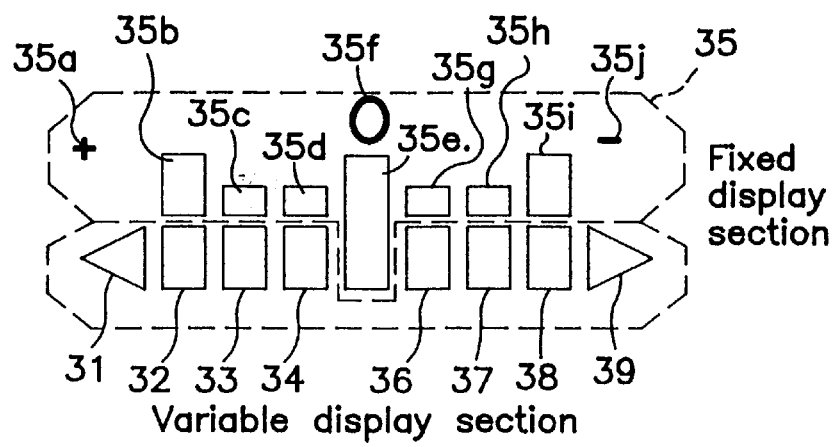
FIG. 16 is a diagram showing an example of a conventional display section.

In accordance with the present invention, it is possible to indicate over/under exposed conditions beyond the range that can be expressed through lighting of the triangular symbol display segments 31 and 39 with the configuration of the conventional display section shown in FIG. 16. Specifically, the conventional display configuration shown in FIG. 16 can only indicate when $\pm 1[EV]$ over/under exposure is exceeded, while the present invention can correctly indicate the exposure value for the over/under exposure conditions up to $\pm 3[EV]$.

Furthermore, in accordance with embodiments of the present invention, it is possible to modify the resolution of the display to expand the display range for the standard display, while a display range can be expanded within the range with fixed resolution for an optional display.

A second embodiment of the present invention will now be described with reference to FIG. 12, which is a diagram illustrating a configuration of the display section 14. As shown in FIG. 12, the display includes symbol display segments 81–87, resolution display segments 92–96, section display segments 102–106 and origin display segments 112–116. Each group of display segments 82–86, 92–96, 102–106 and 112–116 is arranged in a single horizontal row with display segments aligned on a one-to-one basis. Further, a "1" display segment 91, a "+" display segment 101, and a "2" display segment 111 are arranged in a vertical direction on the triangular signal display segment 81 side of the display, at the left side of FIG. 12. Similarly, a "1" display segment 97, a "−" display segment 107, and a "2"

display segment 117 are arranged in a vertical direction on the triangular symbol display segment 87 side of the display, at the right side of FIG. 12.

In accordance with the second embodiment of the present invention, the display can accommodate a display area which is much smaller than the display area of the first embodiment (FIG. 2). Specifically, the number of square symbol display segments, resolution display segments, section display segments and origin display segments are respectively reduced from seven to five, and the "3" display segment is omitted.

Figure 13:
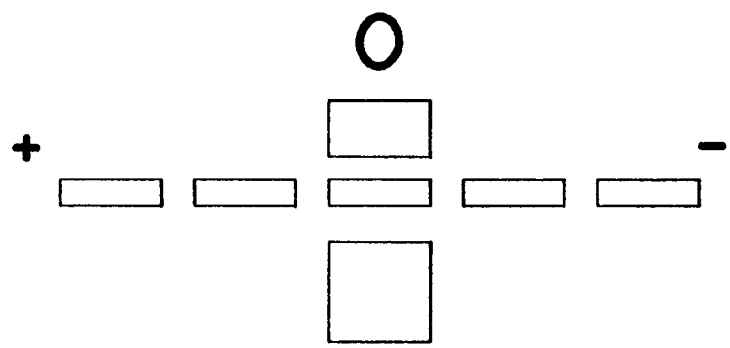
FIG. 13 is a diagram showing an example of a display during correct exposure in accordance with the second embodiment of the present invention.

In comparison with the standard display described above with respect to a the first embodiment of the invention, the second embodiment of the invention utilizes five square symbol display segments 82–86 and a display having a range ±1[EV] can be achieved using a ⅓[EV] step resolution, and further, a display having a range ±2[EV] can be achieved using a ½[EV] step resolution, as shown in FIGS. 13–15.

A brief explanation of various displays which can be achieved with the display configuration shown in FIG. 12 is provided below with reference to FIGS. 13–15 which illustrate various display examples in accordance with the second embodiment of the present invention.

FIG. 13 is an example of a display during the correct exposure in accordance with the second embodiment of the present invention.

Figure 14A:
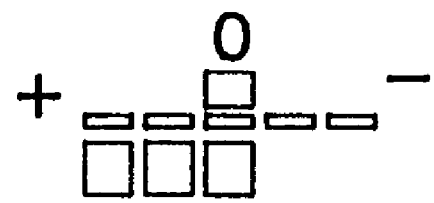
FIG. 14 is a diagram showing an example of a display during an over exposure condition in accordance with the second embodiment of the present invention.
Figure 14B:
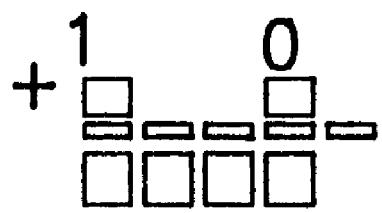
Figure 14C:
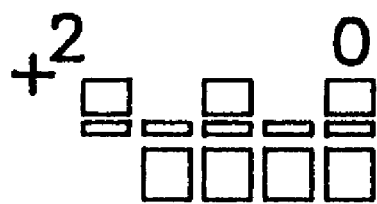
Figure 14D:
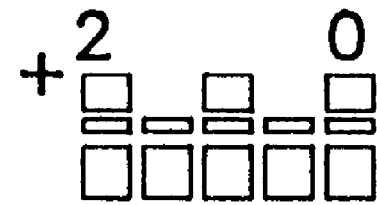
Figure 14E:
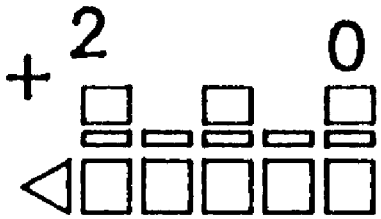

FIGS. 14A–14E are examples of displays of an over correct exposure condition in accordance with the second embodiment of the present invention. FIG. 14A is a display of ⅔[EV] over exposure; FIG. 14B is a display of 1[EV] over exposure; FIG. 14C is a display of 1½[EV] over exposure; FIG. 14D is display of 2[EV] over exposure; and FIG. 14E is a display of above 2[EV] over exposure.

Figure 15A:
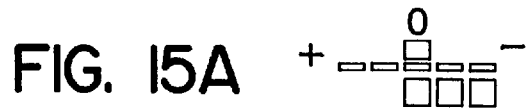
FIG. 15 is a diagram showing an example of a display during an under exposure condition in accordance with the second embodiment of the present invention.
Figure 15B:
Figure 15C:
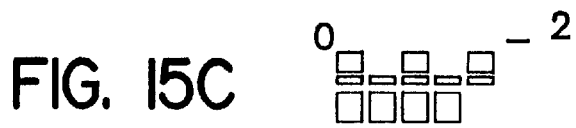
Figure 15D:
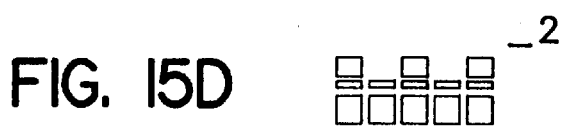
Figure 15E:
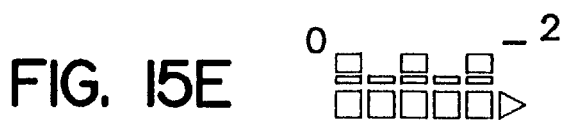

FIGS. 15A–15E are examples of displays of under correct exposure condition in accordance with the second embodiment of the present invention. FIG. 15A is a display of ⅔[EV] under exposure; FIG. 15B is a display of 1[EV] under exposure; FIG. 15C is a display of 1½[EV] under exposure; FIG. 15D is a display of 2[EV] under exposure; and FIG. 15E is a display of below 2[EV] under exposure.

In accordance with embodiments of the present invention described above, the displays indicate the deviation in ΔEV during manual exposure. However, the present invention is not limited to display of ΔEV during manual exposure. The present invention can be applied in a manner similar to that described above to display various types of values, such as an exposure compensation amount, a light adjustment amount, differences between central photometry and multi-photometry, or other values as long as the values can be represented as discrepancies from a reference numerical value.

In accordance with embodiments of the present invention, the display device can advantageously display many specific values on a display which occupies limited physical space. More particularly, many specific values can be displayed in a limited display space with a display comprising a first display element group having display elements which are selectively lit to display a specific value, and a second display element group having display segments which indicate an origin position. By lighting selected display segments from the first display element group with respect to an origin position which is indicated by a selected display segment from the second display element group, it is possible to display many specific values by effectively using all of the first display element group.

The display device in accordance with the present invention can advantageously indicate a display scale based on a display value.

The display device in accordance with the present invention can advantageously display a range corresponding to a display value.

The display device in accordance with the present invention can advantageously display the resolution of the display based on the display value.

The display device in accordance with the present invention can advantageously display a positive or negative symbol for a display value.

The display device in accordance with the present invention advantageously allows display of a display value greater than a designated value, variation of the scale display is reduced and the first display element group is lit according to the variation, thereby enabling the ability to display a display value as a specific value with a constant resolution even if the display value is large.

The display device in accordance with the present invention advantageously allows the resolution to be modified by changing a display range as the variation of the display scale of the second display element group is modified and the display of the first display element group is also modified based on the variation in scale range.

In accordance with embodiments of the present invention, the display range can be expanded to display a specific value even if the display value is large. Further, the display range can be expanded with or without changing the resolution. Consequently, in accordance with the present invention, it is possible to easily respond to various requirements of users that could not have been accommodated in an analog display area with a limited display section.

Further, in accordance with embodiments of the present invention, lighting of every display element can be individually and independently controlled. Accordingly, the display can be configured so that unnecessary display parts are not lit, thereby enabling the ability to reduce the consumption of electrical power. Consequently, the present invention can provide a display device suitable for cameras and exposure meters that require batteries as a power source.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A display device, comprising:
   a first display element group having display elements which are selectively activated to display a display value;
   a second display element group positioned near the first display element group and having a plurality of display elements, the plurality of display elements being independently activatable to respectively indicate a plurality of different origin positions; and
   a control unit to control display of the display value by activating selected display elements from the first display element group with respect to the origin position indicated by activating a display element from the second display element group.

2. A display device as recited in claim 1, further comprising:
   a third display element group positioned near the first and second display element groups to display a scale corresponding to the display value.

3. A display device as recited in claim 1, further comprising:
   a fourth display element group positioned near the first and second display element groups to display a range corresponding to the display value.

4. A display device as recited in claim 3, further comprising:
   a fifth display element group positioned near the first and second display element groups to display a resolution of the display corresponding to the display value.

5. A display device as recited in claim 1, further comprising:
   a positive display element positioned near the first and second display element groups to display a positive value corresponding to the display value; and
   a negative display element positioned near the first and second display element groups to display a negative value corresponding to the display value.

6. A display device, comprising:
   a first display element group to indicate a display value;
   a second display element group positioned near the first display element group to indicate a scale corresponding to the display value; and
   a control unit to control activation of the first display element group according to the display value, and to adjust the scale by selectively activating the second display element group, wherein a range of the display value displayed by the first display element group is changed.

7. A display device, comprising:
   a first display element group to indicate a display value;
   a second display element group positioned near the first display element group to indicate a scale corresponding to the display value;
   a selection device to select respective ranges of the first and second display element groups; and
   and a control unit to control activation of the first display element group according to the display value, to adjust the scale indicated by the second display element group according to a range selected by the selection device and to adjust the indication of the first display element group based on the adjustment of the scale.

8. A display device to display a display value, comprising:
   a first display element group including a plurality of display segments which are selectively activated to indicate the display value according to a number of the display segments of the first display element group which are activated;
   a second display element group including a plurality of display segments the plurality of display elements being independently activatable to respectively indicate a plurality of different origin positions according to a display segment which is activated; and
   a control unit to activate an origin display segment and a number of display segments of the first display element group according to the display value to display the display value.

9. A display as recited in claim 8, further comprising:
   a third display element group including a plurality of display segments positioned near the first display element group and the second display element group to indicate a display scale according to the display value.

10. A display device as recited in claim 9, further comprising:
    a fourth display element group including a plurality of display segments positioned near the first and second display element groups to display a display range according to the display value.

11. A display device as recited in claim 10, further comprising:
    a fifth display element group including a plurality of display segments positioned near the first and second display element groups to display a resolution of the display corresponding to the display value.

12. A display device as recited in claim 11, further comprising:
    a positive display element positioned near the first and second display element groups to display a positive value corresponding to the display value; and
    a negative display element positioned near the first and second display element groups to display a negative value corresponding to the display value.

13. A display device as recited in claim 9, wherein the control unit adjusts the display scale by selectively activating the third display element group, wherein a range of the display value displayed by the first display element group is changed.

14. A display device as recited in claim 8, further comprising a sensor to measure a display value,
    wherein the control unit comprises a display table containing a plurality of ranges of display values, and the display segments which are activated are selected according to a range into which the measured value falls.

15. A display device as recited in claim 14, wherein the display table includes drive data corresponding to the range into which the measured value falls for driving selected display segments.

16. A display device as recited in claim 13, wherein every other display segment of the third display element group is activated to indicate increments of ½.

17. A display scale as recited in claim 13, wherein every third display segment of the third display element group is activated to indicate increments of ⅓.

18. A display device to display a display value, comprising:
    a first display element group including a plurality of display segments which are selectively activated to indicate the display value according to a number of the display segments of the first display element group which are activated;
    a second display element group including a plurality of display segments which are selectively activated to indicate an origin position according to a display segment of the second display element group which is activated;
    a third display element group including a plurality of display segments positioned near the first display element group and the second display element group to indicate a display scale according to the display value; and
    a control unit to activate an origin display segment and a number of display segments of the first display element group according to the display value to display the display value,
    wherein the control unit adjusts the display scale by selectively activating the third display element group, wherein a range of the display value displayed by the first display element group is changed.

19. A display device to display a display value, comprising:
    a first display element group including a plurality of display segments which are selectively activated to indicate the display value according to a number of the display segments of the first display element group which are activated;

a second display element group including a plurality of display segments which are selectively activated to indicate an origin position according to a display segment of the second display element group which is activated;

a sensor to measure a display value; and a control unit to activate an origin display segment and a number of display segments of the first display element group according to the display value to display the display value, wherein the control unit comprises a display table containing a plurality of ranges of display values, and the display segments which are activated are selected according to a range into which the measured value falls; and wherein the display table includes drive data corresponding to the range into which the measured value falls for driving selected display segments.

\* \* \* \* \*

UNITED STATES PATENT AND TRADEMARK OFFICE
CERTIFICATE OF CORRECTION

PATENT NO. : 5,995,068
DATED : November 30, 1999
INVENTOR(S) : Takashi Saegusa It is certified that error appears in the above-identified patent and that said Letters Patent is hereby corrected as shown below:

Title page item [56] References Cited FOREIGN PATENT DOCUMENT

Title Page, [56] References Cited, FOREIGN PATENT DOCUMENT, ADD 8-262551 10/1996 Japan Column 15, line 33-34, (claim 7), delete "and" (second occurrence).

Signed and Sealed this

Twenty-first Day of November, 2000

*Attest:*

Q. TODD DICKINSON

*Attesting Officer*     *Director of Patents and Trademarks*